United States Patent [19]

Poole et al.

[11] 4,205,423
[45] Jun. 3, 1980

[54] METHOD OF RETIPPING TOP-DRIVE FILLING SPINDLES

[75] Inventors: Ernest G. Poole, Charlotte; Lucius M. Hair, Pineville, both of N.C.

[73] Assignee: The Kendall Company, Boston, Mass.

[21] Appl. No.: 947,326

[22] Filed: Oct. 2, 1978

Related U.S. Application Data

[60] Continuation-in-part of Ser. No. 757,949, Jan. 10, 1977, Pat. No. 4,115,911, which is a division of Ser. No. 568,560, Apr. 16, 1975, Pat. No. 4,010,600.

[51] Int. Cl.² .............................................. B23P 7/00
[52] U.S. Cl. .................................... 29/402.11; 29/445; 29/458; 29/469.5; 29/525; 57/129; 242/46.21; 242/118.3
[58] Field of Search .................. 29/458, 526 R, 525, 29/445, 469.5, 401 R, 401 D; 57/129, 130, 135; 242/46.21, 118.3

[56] References Cited

U.S. PATENT DOCUMENTS

| | | | |
|---|---|---|---|
| 2,331,611 | 10/1943 | Kennedy et al. | 242/46.21 |
| 2,582,325 | 1/1952 | Gleitz et al. | 57/130 |
| 2,708,336 | 5/1955 | Gleitz | 57/130 |
| 2,775,859 | 1/1957 | Winslow | 57/135 |
| 2,922,274 | 1/1960 | Sacchini | 242/46.21 X |
| 3,146,142 | 8/1964 | Maly | 29/458 UX |
| 3,431,628 | 3/1969 | Miller et al. | 29/526 R X |
| 3,534,917 | 10/1970 | Blake | 242/46.21 |
| 3,782,660 | 1/1974 | Blake | 242/46.21 |
| 4,034,462 | 7/1977 | Hentges | 29/401 D |

*Primary Examiner*—Charlie T. Moon
*Attorney, Agent, or Firm*—Edward J. Scahill

[57] ABSTRACT

A top-drive filling spindle having wear on its tapered tip can advantageously be retipped by cutting the worn tip thereoff up to a predetermined point thereon; boring a hole into the middle of said cut spindle tip; placing a male through hardened replacement tip in said hole; securing the tip thereon; and, grinding the thusly secured sleeve to the standard taper for top-drive filling spindles. With the application of the through hardened sleeve, it is anticipated that spindle wear would not occur for perhaps six to twelve years or more—a two to three fold increase over the life of spindles currently used by those skilled in the art.

4 Claims, 6 Drawing Figures

U.S. Patent
Jun. 3, 1980
4,205,423
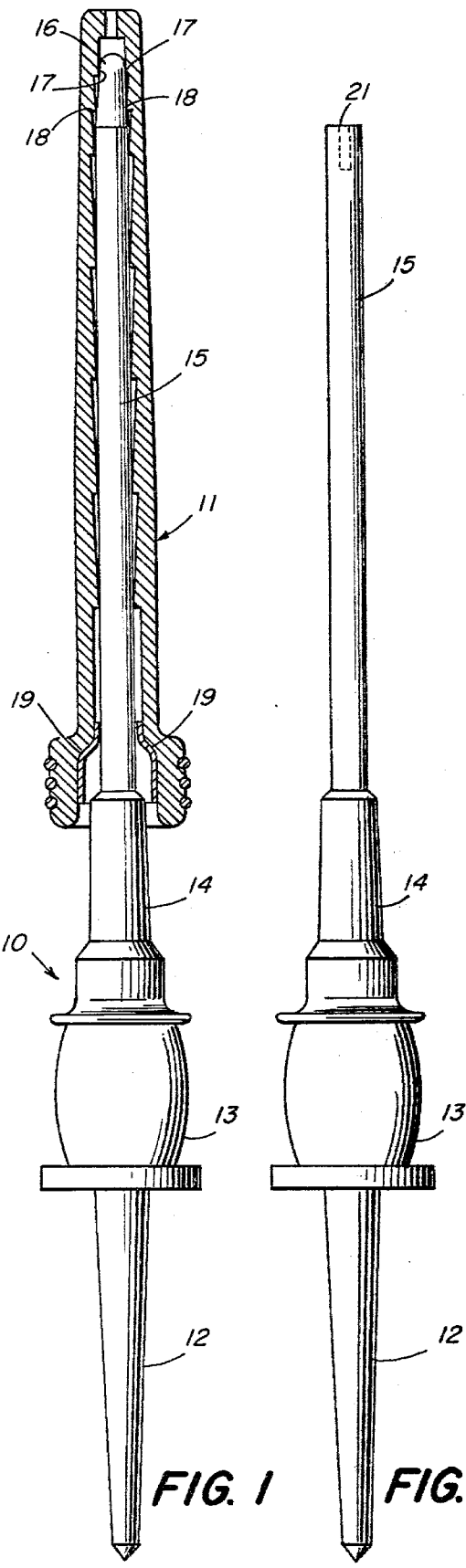
FIG. 1
FIG. 2
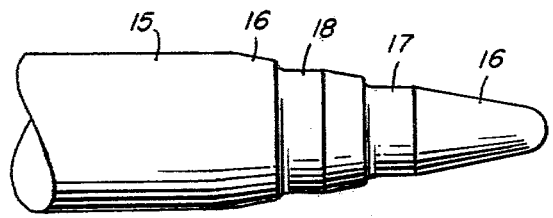
FIG. 3
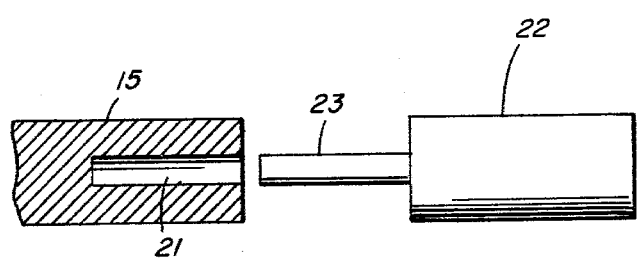
FIG. 4
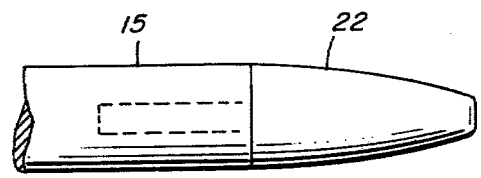
FIG. 5
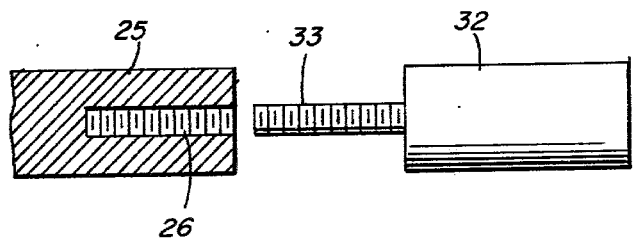
FIG. 6

METHOD OF RETIPPING TOP-DRIVE FILLING SPINDLES

This application is a continuation-in-part of U.S. Ser. No. 757,949 filed on Jan. 10, 1977, now U.S. Pat. No. 4,115,911 issued Sept. 26, 1978; which is a division of U.S. Ser. No. 568,560 filed on Apr. 16, 1975, now U.S. Pat. No. 4,010,600 issued Mar. 8, 1977.

BACKGROUND OF THE INVENTION

Since before the turn of the century, the use of a spinning frame or twister in the manufacture of textile yarn, both cotton and manmade, has been widespread. A vital part of the spinning frame is known as the spindle which consists of a steel blade and bolster. A quill or bobbin has been an essential companion to the spindle since the invention of the spinning wheel, and the method of mounting the quill on the spindle has always presented a problem.

Prior to the advent of top-drive filling spindles, an acorn type or "bottom-drive" filling spindle was widely used. In this case, the quill, normally made of wood or the like, was applied to the revolving spindle to wind the textile yarn onto the quill after twist has been imparted thereto by the spinning frame, spinning ring and traveler. With the use of the acorn type of spindles, the speeds attainable therewith were somewhat limited due to gyration of the quill on the spindle. These gyrations further caused inconsistencies and imperfections to appear in the woven fabrics.

Accordingly, those skilled in the art turned to top-drive filling spindles with increasing frequency. In designing the spindle, provisions were made for this spindle to carry its full load without vibration or gyration. With the use of top-drive filling spindles, the drive point between the spindle and quill was moved from directly above the acron of the spindle to the tapered tip of the spindle. The tip is tapered at the top to fit the internal bore of the quill, the contact between the spindle and quill at this point providing the sole driving of the quill. By utilizing this mode of driving the quill, it tends to find its own center of rotation, the gyration or vibration is greatly reduced, and, as a result, much higher spindle speeds are possible to achieve and are actually accomplished.

Although the spindle is of induction hardened steel, wear still occurs on the spindle tapered tip after three or four years. Thus, slippage between the spindle and quill occurs, thereby causing less than calculated twist in the yarn being spun. It therefore becomes necessary to rework the taper of the spindle, so as to restore the original dimensions to the tapered spindle tip and consequently obtain additional use therefrom. In the past, this reworking has consisted of two basic methods: (a) a rehardening of the spindle tip and subsequent regrinding of the taper; and, (b) cutting the old tip off and subsequently butt welding a new tip on, rehardening, and then grinding to the desired taper. Both of these methods have advantages and disadvantages. In the simple rehardening process (a), the obvious advantage is cost and, normally, less manufacturing time, while the big disadvantage is that the regrinding process removes metal from the spindle tip, thereby causing the quill to drop and give less clearance at the acorn (bottom) of the spindle. This clearance is, of course, critical and if the grinding is not carried out with extreme accuracy, the result will be an acorn driven quill that results in much gyration and vibration. The advantage of the butt welding method (b) is that the disadvantage of the rehardening process is eliminated, as a new spindle specification is restored. However, the disadvantage of this method is cost, usually more manufacturing time and a relatively high percentage of butt weld failures. Additional disadvantages of both methods is the normal use therein of induction type hardening of the tips. Induction hardening of steel results in layers of hardening, with each successive layer from the outer case or surface producing a lower degree of hardness. In the actual use of a spindle tip hardened by these methods therefore, wear is greatly accelerated once the outer hardness becomes worn away. As a result, spindle tips produced thereby have a relatively short useful life span.

Another object of the present invention is to provide an economic, efficient and reliable method of retipping worn top-drive filling spindles.

Still another object of the instant invention is to provide a top-drive filling spindle having a tapered tip portion that can be successfully retipped an indefinite number of times with ease, speed and low cost.

SUMMARY OF THE INVENTION

The uppermost, tapered tip portion of a top-drive filling spindle comprises a neck portion having a hole in the middle thereof that is covered by a piece of a through hardened material securely disposed therein, said piece having a male portion extending therefrom that fits into the hole. The sleeve is ground to a predetermined taper prior to use with a quill in the manufacture of textile yarns. A thusly constructed top-drive filling spindle and the method of making same can be used on not only existing worn spindle blades, but also on new spindle blades as presented by a spindle manufacturer. By applying the piece of uniformly hardened material to new spindles, the thusly treated spindle blade is automatically ready to accept a new tip or male piece, should the existing one become worn out. However, these spindle tips should have a life expectancy of between six and twelve years or more, and, if and when, wear does occur, it will be gradual wear rather than accelerated wear.

BRIEF DESCRIPTION OF THE DRAWINGS

FIG. 1 shows a perspective view of a top-drive filling spindle having a typical quill disposed thereon;

FIG. 2 shows a perspective view of a top-drive filling spindle having a hole bored into the cut tip of the spindle;

FIG. 3 shows an enlarged view of a spindle tip as described in this invention having worn areas or rings thereon;

FIG. 4 shows an enlarged view of the bored tip or neck portion of the spindle of this invention and the male portion of hardened material;

FIG. 5 shows an enlarged view of the spindle tip described herein having the hardened male portion secured thereon and ground to a predetermined taper; and, FIG. 6 shows an enlarged view of another embodiment of attaching the male portion to the spindle of this invention.

DETAILED DESCRIPTION OF THE PREFERRED EMBODIMENTS

Top-drive filling spindles have for years been made from a steel with a high carbon content that can be heated by an induction coil and rapidly quenched. This process produces a spindle blade that has a hard outer surface, but leaves the inner core relatively soft and ductile. Thus, spindles prepared in this manner have both ends very hard and a center portion that is left soft enough so that the spindle shaft can be straightened. However, this long used method of making spindles produces a blade that can be rather unpredictable as regards the degree and depth of hardness therein. Accordingly, once wear starts on the spindle at the point where it engages the quill, it proceeds at an extremely accelerated rate due to this soft inner core, so that the lift expectancy of a new spindle is only about three to four years.

It has now been discovered that top-drive filling spindles made as outlined above can be given a life expectancy of six to twelve years or more by grinding down the uppermost tapered tip portion of the spindle to a predetermined diameter, and covering the thusly ground spindle tip with a sleeve of material possessing a high degree of hardness throughout. This newly formed tip is then retooled so as to produce a particular standard taper on the spindle.

This operation can be more readily described by reference to the drawings wherein FIG. 1 shows a top-drive filling spindle 10 having a quill 11 disposed thereon. The spindle 10 comprises a spindle base 12, a whorl 13, and acorn taper at 14 and a spindle blade 15 which has a predetermined taper at the uppermost tip portion 16. The tapered tip 16 engages the quill 11 at points 17 and 18 thereon. Thus, the quill 11 is permitted to spin and perform the function that it was designed to perform. However, wear occurs at areas 17 and 18 thereon after repeated use and causes the quill 11 to drop on the spindle and to gyrate and vibrate thereon. In some cases this drop is so great as to cause the driving action to occur at the acorn taper 14 of the spindle 10 wherein the quill bushing 19 engages the acorn taper 14. FIG. 3 shows an enlarged view of the tapered tip portion of the spindle blade wherein worn areas or points 17 and 18 are shown in a somewhat exaggerated condition.

FIG. 2 shows the spindle 10, after the worn areas have been removed therefrom by cutting the worn portion completely off. The middle portion of the cut spindle can then be drilled or bored out, as shown at 21, to facilitate the placing and securing therein of the replacement tip as will be described in more detail hereinafter.

FIG. 4 shows the top of the cut and drilled spindle 21 in enlarged detail so as to better show how the replacement of the spindle tip is carried out. A replacement tip 22 of hardened material having a male portion extending from the middle thereof, which is approximately the same diameter as the hole in the drilled spindle 21. The male portion of hardened material 22 can advantageously be pressed into cut and drilled spindle at 21 and secured thereto by exerting sufficient force on the hardened material 22 as to cause the securement of same into the drilled out portion 21. Ordinarily, this press fit is of sufficient strength as to securely hold the sleeve in working contact with the spindle. However, some sort of adhesive or the like could be used to insure a stronger bond between the spindle and the hardened material, for example, the cut and drilled portion 21 may contain a drop or two of Loctite 242, a tradename for an anaerobic sealant manufactured by Loctite Corporation of Newington, Conn., prior to the replacement therein of the hardened material 22. Of course, other similar adhesives and bonding materials could be used with similar results.

Once the piece of hardened material 22 is securely positioned in butting relationship with the spindle blade 16, the piece of hardened material may then be ground to a predetermined and standard taper for top-driving filling spindles. This can be shown in FIG. 5 wherein the secured piece of hardened material 22 has been ground to the original taper specification of a new top-drive filling spindle. The piece of hardened material 22 is advantageously a through hardened steel, having uniform hardness throughout, so that if contact occurs between the tip and the quill at points 17 and 18, wear will occur very gradually and over a very long period of time. This is contrasted with standard prior art top-drive filling spindles which have a relatively soft inner core wherein, once the hard outer case wears away, a rapid and accelerated wear occurs on the spindle tip within a very short period of time causing vibration and gyrations to occur when the quill is driven on the spindle blade. However, although through hardened steel is preferred as the sleeve material of this invention, other uniformly hardened materials can be used with similar, although possibly somewhat less desirable, results. Such other materials would include ceramic or glass bits and carbide materials or the like. By through hardened steel is meant a furnace fired steel which is produced in such a manner as to harden the steel material uniformly throughout the body thereof.

This invention can be further explained by way of the following example:

EXAMPLE

A worn top-drive filling spindle having worn areas or points on the uppermost and tapered portion thereof as shown in FIG. 3 at 17 and 18, can effectively be renewed or restored by cutting the worn portion completely off and drilling into the center of the cut end to a predetermined depth, as shown at 21 of FIG. 4. A couple of drops of an adhesive, or the like, can then be deposited into the hole at 21.

The cylindrically shaped piece of hardened material 22 can be made from three-eighth inch diameter bar-type oil hardened tool steel, cold finished and annealed. The replacement tip, hardened throughout, is made with approximately 0.003 inch clearance between the hole and the tip. All of the machining operations can be performed on an automatic screw machine lathe that has been previously tooled up. The steel piece used herein was hardened and tempered to give a hardness of Rockwell C 58-60.

The new tip is then press fit into the newly drilled spindle tip, being further secured thereto by means of a liquid sealant/adhesive compound or the like. Finally, the thusly worked spindle tip is ground to a taper of 0.150 inch per inch on the outside thereof. The spindle is then checked for true alignment and is straightened if required.

Another embodiment of this invention is shown in FIG. 6 wherein the cut and drilled portion 25 has threads 26 formed therein, and the piece of hardened material 32 is made with a threaded male portion such as at 33. A spindle manufactured or retipped in this manner can facilitate replacement greatly because a worn tapered tip can then be simply unscrewed and removed while a new tip of hardened material can then replace it by simply screwing into the drilled portion 25 at 26. The thusly positioned tip can then be ground to a predetermined taper as described above and can be ready for subsequent use within a very short time after removal from the spinning frame. Of course, a lock-type sealant/adhesive can also be used therewith to insure a strong bond between the sleeve and the threaded spindle blade.

Top-drive filling spindles of this construction have extended the life of spindles by nearly two to three times what is normally now expected. Accordingly, those skilled in the art can now use and reuse spindles for an indefinite period of time, at a very low cost and with a minimum of down time. Furthermore, spindles utilizing the hardened tip portion described herein have a greatly reduced incidence of gyration and vibration, since the wearing on the spindle tip is a very gradual process.

The above-described specific embodiments of this invention have been set forth for the purpose of illustration. It will become apparent to those skilled in the art that various modifications may be made in the structure of this top-drive filling spindle tip without departing from the principles of this invention as pointed out and disclosed herein. For that reason, it is not intended that the invention should be limited other than by the scope of the appended claims.

We claim:

1. A method of making a top-drive filling spindle having a tapered tip thereon of hardened material comprising:
    cutting a worn portion completely off the uppermost tip of a top-drive filling spindle blade;
    drilling a hole of predetermined width and depth into the middle of said cut portion;
    placing a cylindrical piece of through hardened metal material having a male portion extending from the middle of one end thereof into said hole, said male portion being designed to securely fit into said hole;
    causing said male portion to become securely attached in said hole in butting relationship with said spindle blade; and,
    thereafter forming a predetermined taper uniformly on said piece of hardened material from the abutted end to a smaller end portion by removing material therefrom.

2. The method of claim 1 wherein said male portion of said piece of hardened material is securely attached to said spindle blade by applying of a lock-type sealant/adhesive where said male portion meets said spindle blade.

3. The method of claim 1 including threading said male portion and the inner portion of the hole in said cut spindle, and causing said male portion and said sleeve to become secured together by means of said threading.

4. The method of claim 3 including a lock-type sealant/adhesive on said threaded portions prior to securing said male portion to said spindle.

* * * * *